US006657728B1

(12) United States Patent
Okabe

(10) Patent No.: US 6,657,728 B1
(45) Date of Patent: Dec. 2, 2003

(54) TWO BEAM INTERFERENCE OBJECTIVE DEVICE

(75) Inventor: Kenji Okabe, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/466,875

(22) Filed: Dec. 20, 1999

(30) Foreign Application Priority Data

Dec. 25, 1998 (JP) ............................................. 10-371137

(51) Int. Cl.[7] ................................................. G01B 9/02
(52) U.S. Cl. ..................................................... 356/450
(58) Field of Search .......................... 356/512, 484–516

(56) References Cited

FOREIGN PATENT DOCUMENTS

JP   Y2-2520950   10/1996

*Primary Examiner*—Frank G. Font
*Assistant Examiner*—Andrew H. Lee
(74) *Attorney, Agent, or Firm*—Oliff & Berridge, PLC

(57) ABSTRACT

Width and direction of interference fringes of a two beam interference objective device can be adjusted with a single hand, thereby improving operability and work efficiency. The two beam interference objective device includes an objective lens (1), a prism (12) provided between the objective lens (1) and a sample (4), a reference mirror (13) provided to one of light-paths divided by the prism (12), and a tilting device (14) for tilting the reference mirror (13) to adjust the width and direction of the interference fringes. The tilting device (14) includes a width adjuster (41) for pivotally moving the reference mirror (13) centering an axis parallel to an optical axis of the objective lens (1) while keeping a distance from the optical axis of the objective lens (1) to the reference mirror (13), and a direction adjuster (51) for turning the reference mirror (13) centering the one of divided optical paths.

10 Claims, 5 Drawing Sheets

F I G. 2
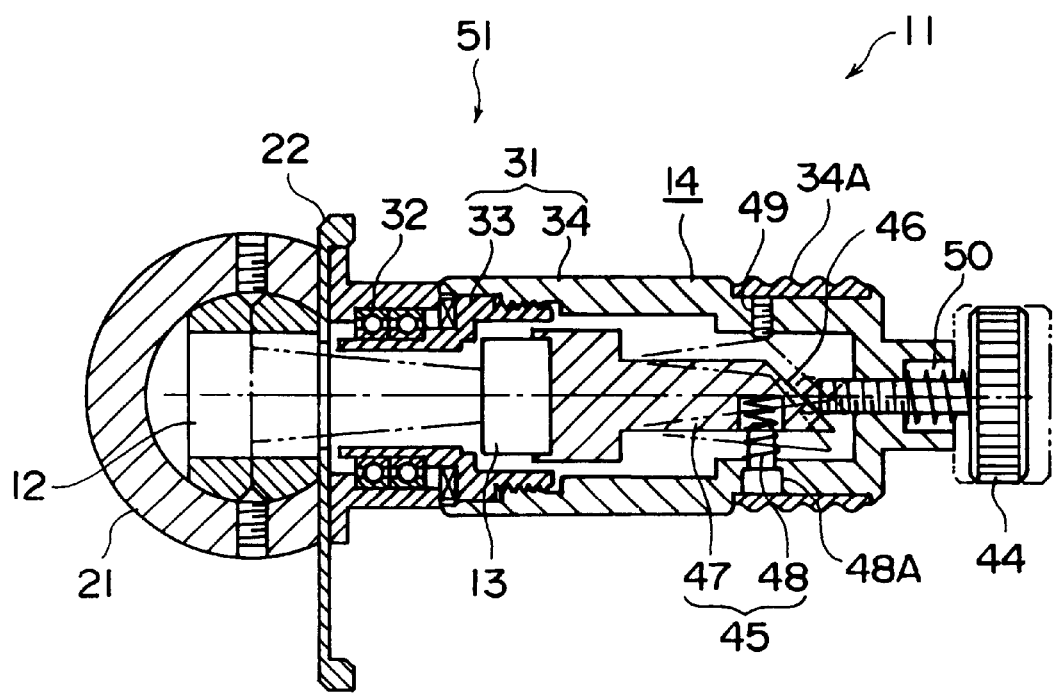

TWO BEAM INTERFERENCE OBJECTIVE DEVICE

BACKGROUND OF THE INVENTION

1. Field of the Invention

The present invention relates to a two beam interference objective device, which can be attached to a microscope etc for use.

2. Description of Relate Art

Conventionally, a two beam interference objective device having an optical path dividing prism and a reference mirror is known.

For example, as shown in FIG. 6, has an objective 101, an optical path dividing prism 102 disposed between the objective 101 and a sample 104, and a reference mirror 103 disposed to one of light-paths divided by the optical path dividing prism 102.

In the two beam interference objective device, when illumination light is irradiated from upside of the objective 101 or left side of the optical path dividing prism 102, the light is divided into two light-paths by the optical path dividing prism 102, which are respectively irradiated to the reference mirror 103 and the sample 104. Then, the lights respectively reflected by the reference mirror 103 and the sample 104 inversely advance and are interfered by being superposed by the optical path dividing prism 102, which is transmitted to an observation equipment body through the objective 101.

At this time, when a distance L1 between the optical path dividing prism 102 and the sample 104 is equal to a distance L2 between the optical path dividing prism 102 and the reference mirror 103 (L1=L2), zero-order interference fringes is generated, and first-order, second-order, third-order interference fringes are generated as a difference between the distance L1 and the distance L2 increases by $\lambda/2$ ($\lambda/2, \lambda, 3\lambda/2 \ldots$) Here, $\lambda$ is a wavelength of the illumination light.

Accordingly, various physical quantities can be measured by analyzing the interference fringes.

Incidentally, some of the two beam interference objective device includes a tilting device for tilting the reference mirror for adjusting width and direction of the interference fringes.

Following two arrangements are known as the conventional tilting, which us disclosed in Publication of Japanese Utility Model Registration No. 2520950.

(1) An arrangement having: two adjusting knobs for tilting the reference mirror for adjusting width and direction of the interference fringes; and another adjusting knob for moving the reference mirror in an optical axis direction so that the reference mirror is located in a conjugate position relative to sample surface.

(2) An arrangement having two adjusting knobs for tilting the reference mirror centering the optical axis of the objective lens.

In the above, the "conjugate position" of the reference mirror and the sample surface refers to a position where the reference mirror and the sample surface are located at the same distance relative to the optical path dividing prism.

However, following problems occur in the above-described arrangements.

According to the tilting device of the first arrangement, since an objective screw portion and a manipulative portion of the tilting device for adjusting interference fringes are fixed relative to a rotation direction around the objective lens optical axis, the adjusting knob has to be manipulated for generating the interference fringes after focusing on a image of the sample in order to set the reference mirror at a conjugate position relative to the sample and the other two adjusting knobs have to be manipulated for adjusting the width and the direction of the interference fringes, thereby complicating operation process to deteriorate work efficiency.

According to the tilting device of the second arrangement, though the conjugate position relative to the sample surface can be constantly maintained by pivotally moving the reference mirror around the optical axis of the objective lens, the two adjusting knobs have to be simultaneously manipulated for adjusting the width and the direction of the interference fringes, which requires both hands for simultaneous adjustment of the two adjusting knobs, resulting in bad operability.

SUMMARY OF THE INVENTION

An object of the present embodiment is to provide a two beam interference objective device capable of adjusting the width and direction of tile interference fringes by a single hand and improving operability and work efficiency for solving the above conventional problems.

A two beam interference objective device according to the present invention has an objective lens; an optical path dividing member provided between the objective lens and a sample; a reference mirror provided to first light-path divided by the optical path dividing member; and a tilting device for tilting the reference mirror to adjust width and direction of an interference fringes generated by a light reflected by the reference mirror and a light reflected by the sample disposed on second light-path divided by the optical path dividing member, the tilting device including: a width adjuster for pivotally moving the reference mirror centering an axis parallel to an optical axis of the objective lens while keeping an approximately constant distance from the optical axis of the objective lens to the reference mirror; and a direction adjuster for turning the reference mirror centering the second divided optical path, the width adjuster and the direction adjuster being manipulatable independently.

In the above, "approximately constant distance from the optical axis of the objective lens to the reference mirror" means both the same distance from the optical axis of the objective lens to the reference mirror and slightly different distance from the optical axis of the objective lens to the reference mirror.

According to the above arrangement, since the width adjuster for adjusting the width of the interference fringes and the direction adjuster for adjusting the direction of the interference fringes are independently manipulatable, the width, for instance, of the interference fringes can be adjusted by manipulating the width adjuster with a single hand and, subsequently, the direction of the interference fringes can be adjusted by manipulating the direction adjuster. Accordingly, the width and the direction of the interference fringes can be adjusted with a single hand.

Further, when the width adjuster is manipulated, since the reference mirror is pivotally moved centering the axis parallel to the optical axis of the objective lens while keeping approximately constant distance from the optical axis of the objective lens to the reference mirror, the width of the interference fringes can be adjusted while fixing the zero-order band of the interference fringes at the center of a visual field. Further, when the direction adjuster is manipulated, since the reference mirror is turned centering the first divided optical path, the direction of the interference fringes can be adjusted while keeping the width of the interference fringes established by the width adjuster. Accordingly, operability and work efficiency can be improved.

In the present invention, the tilting device may include a first accommodating barrel connected to the objective lens and having the optical path dividing member thereinside, a second accommodating barrel connected to the first accommodating barrel and having the reference mirror thereinside, the width adjuster for pivotally moving the reference mirror centering the axis parallel to the optical axis of the objective lens while keeping the approximately constant distance from the optical axis of the objective lens to the reference mirror and the direction adjuster for turning the second accommodating barrel centering the second divided optical path.

According to the above arrangement, in addition to the aforesaid effects (single-hand operation and improvement in operability and work efficiency), since the direction of the interference fringes can be adjusted by rotating the second accommodating barrel having the reference mirror thereinside around the enter of the first divided optical path, minute direction adjustment of the interference fringes is possible.

Further, since the tilting device includes the first accommodating barrel having the optical path dividing member thereinside, the second accommodating barrel connected to the first accommodating barrel and having the reference mirror thereinside, the width adjuster for pivotally moving the reference mirror centering the axis parallel to the optical axis of the objective lens, and the direction adjuster for turning the second accommodating barrel centering the first divided optical path, the two beam interference objective device can be constructed just by connecting the first accommodating barrel of the tilting device to an ordinary objective lens.

In the present invention, the width adjuster may preferably includes a holder pivotablly supported in the second accommodating barrel centering the axis parallel to the optical axis of the objective lens and having the reference mirror, an adjusting knob screwed to the second accommodating barrel along the first divided optical path direction, and a movement converter for converting a movement of the adjusting knob in an axial direction thereof to a pivotal movement of the holder.

Accordingly, since the adjusting knob for adjusting the width of the interference fringes is screwed to the second accommodating barrel for adjusting the direction of the interference fringes along the first divided optical path direction, in other words, since the second accommodating barrel and the adjusting knob are closely disposed coaxially with the first divided optical path, interference fringes width adjustment can be rapidly switched to interference fringes direction adjustment, and vice versa.

The first accommodating barrel may preferably be rotatable centering the optical axis of the objective lens.

Accordingly, since manipulative position of the width adjuster and the direction adjuster can be turned centering the optical axis of the objective lens, the manipulative position can be shifted to an easier position for the observer to manipulate.

A shutter for opening and closing the first divided optical path may preferably be provided between the optical path dividing member and the reference mirror.

Accordingly, both of the interference fringes and brightfield can be observed with a single objective lens by opening and closing the first divided optical path by the shutter.

BRIEF DESCRIPTION OF THE DRAWINGS

FIG. 2 is a cross section taken along II—II line in FIG. 1;

DETAILED DESCRIPTION OF PREFERRED EMBODIMENT(S)

An embodiment of the present invention will be described below with reference to attached drawings.

Figure 1:
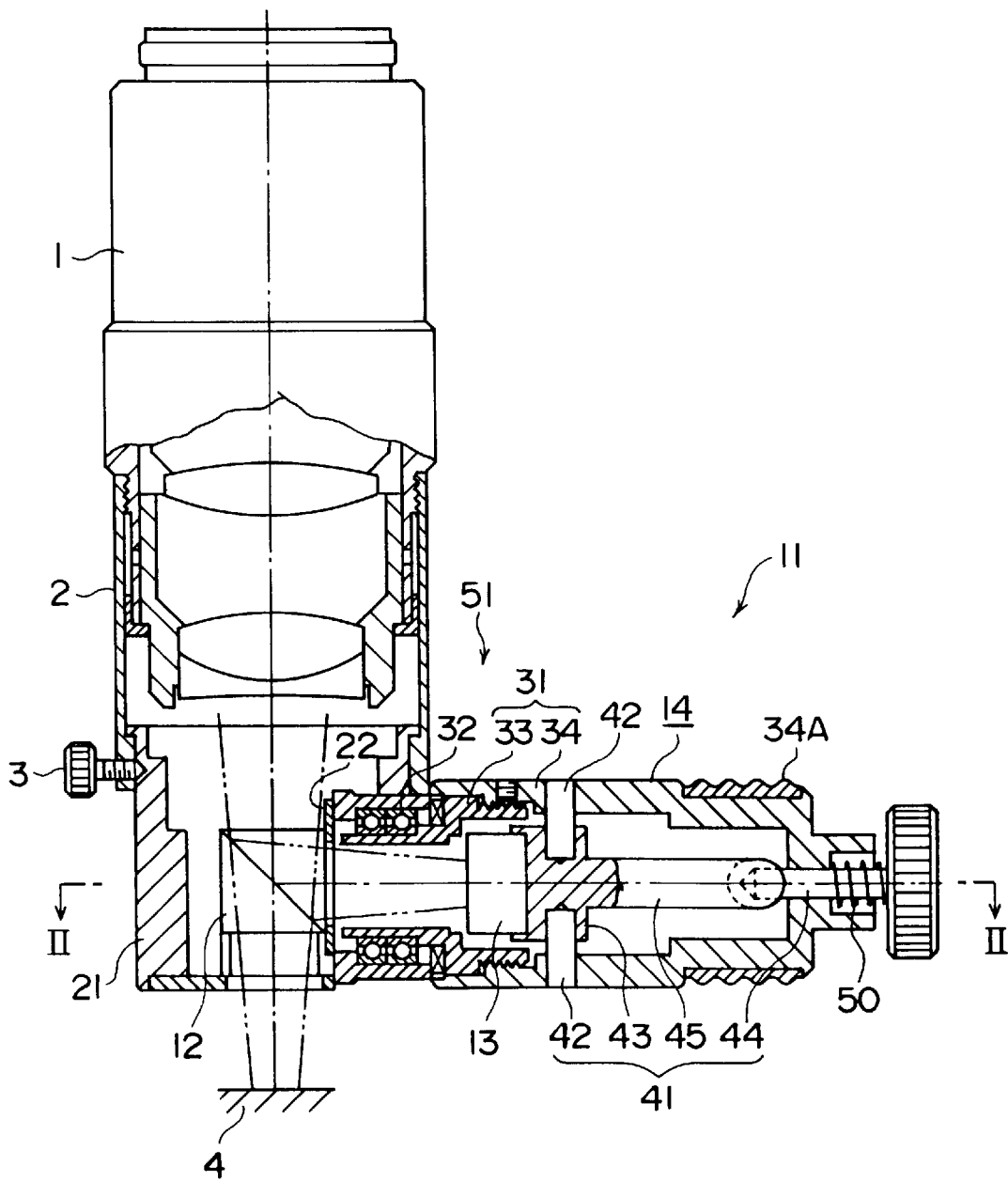
FIG. 1 is a cross section showing an embodiment of a two beam interference objective device according to the present invention.

FIG. 1 is a cross section showing a two beam interference objective device according to the present embodiment, and FIG. 2 is a cross section taken along II—II line in FIG. 1.

As shown in the figures, the two beam interference objective device according to the present embodiment has an objective 1 detachably mounted to a revolver of a microscope etc., and an optical interference unit 11 connected orthogonally with the objective 1 through a retaining ring 2 and rotatably around an optical axis of the objective 1.

The objective 1 is made of a combination of a plurality of lens.

An upper part of the retaining ring 2 is screwed and fixed to a lower part of the objective 1 and a lower part of the retaining ring 2 holds the optical interference unit 11 rotatably around the optical axis of the objective 1 and fixably by a set-screw 3. Accordingly, since the optical interference unit 11 can be rotated around the optical axis of the objective 1 by loosening the set-screw 3, a manipulative portion of the optical interference unit 11 can be shifted to a position easy for an observer to manipulate for observation.

The optical interference unit 11 has a prism 12 as an optical path dividing member disposed between the objective 1 and a sample 4, a reference mirror 13 provided at a halfway of first light-path divided by the prism 12, and a tilting device 14 for tilting the reference mirror 13 to adjust a width and a direction of an interference fringes generated by a light reflected by the reference mirror 13 and a light reflected by the sample 4 disposed to second light-path divided by the prism 12.

The tilting device 14 has a prism-accommodating barrel 21 as a first accommodating barrel connected to the objective 1 through the retaining ring 2 and having the prism 12 thereinside, a mirror-accommodating barrel 31 as a second accommodating barrel connected to the prism-accommodating barrel 21 and having the reference mirror 13 thereinside, a width adjuster 41 for pivotally moving the reference mirror 13 around an axis parallel to the optical axis of the objective 1 while keeping an approximately constant distance from the optical axis of the objective 1 to the reference mirror 13, and a direction adjuster 51 for turning the mirror accommodating barrel 31 around the first light-path divided by the prism 12.

The prism-accommodating barrel 21 is provided with a slidable shutter 22 for opening and closing the light-path between the prism 12 and the reference mirror 13, in other words, the first light-path divided by the prism 12.

The mirror-accommodating barrel 31 is composed of an internal barrel 33 supported by the prism-accommodating barrel 21 around the first light-path through a bearing 32, and an external barrel 34 screwed and fixed to an outside of the internal barrel 33 and having the reference mirror 13 thereinside: Here, the direction adjuster 51 for turning the mirror-accommodating barrel 31 around the first light-path divided by the prism 12 is constructed of the bearing 32 and the like. Incidentally, a manipulative portion 34A having irregularity on a surface thereof is provided on an outer circumference of the external barrel 34.

The width adjuster 41 has a holder 43 pivotally supported around an axis parallel to the optical axis of the objective 1, a pair of pin 42 here, and having the reference mirror 13 on a surface opposing the prism 12, an adjusting knob 44 screwed to the mirror-accommodating barrel 31 along a direction of the first light-path, and a movement converter 45 for converting an axial movement of the adjusting knob 44 to a pivot movement of the holder 43. Though the pin 42 is located to a position different from a light-reflective surface of the reference mirror 13, the pin 42 is disposed as close to the light-reflective surface as possible.

Figure 3:
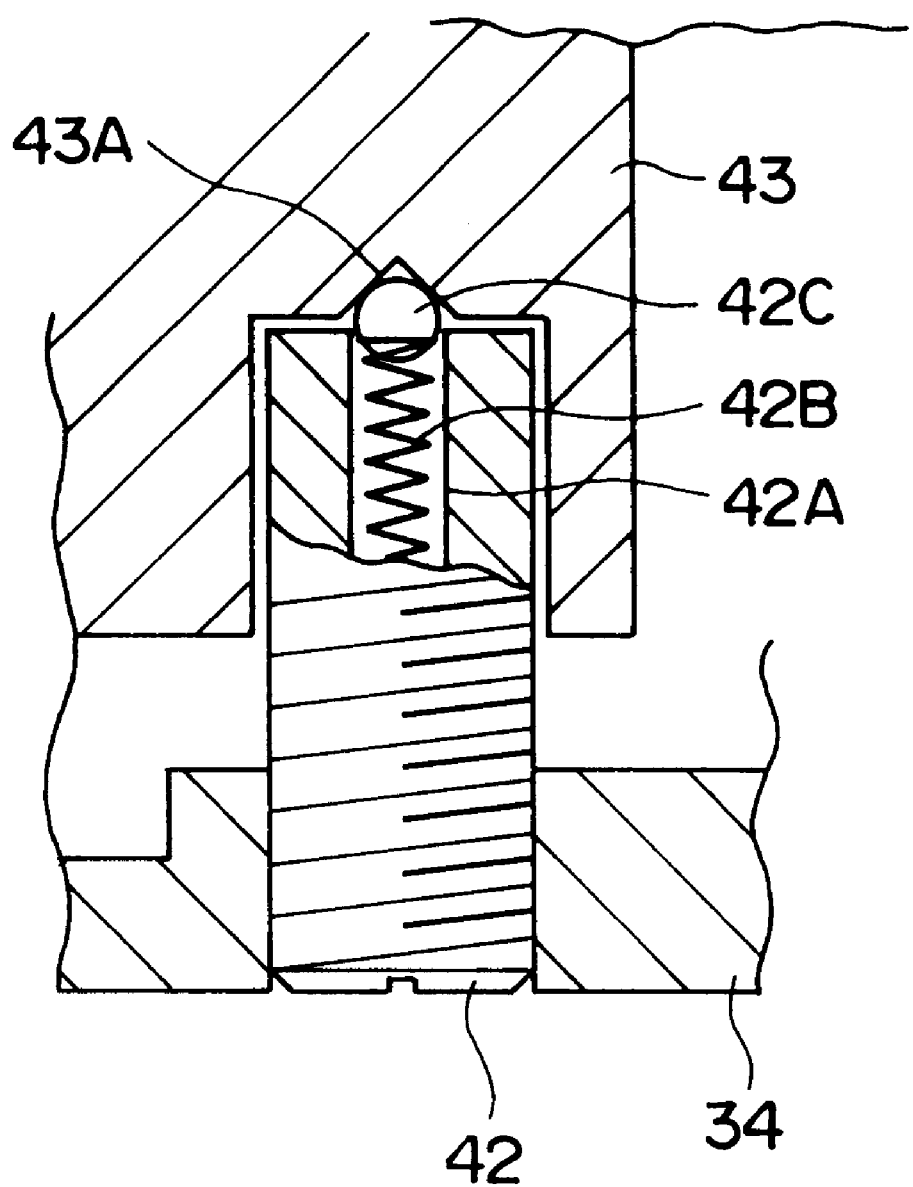
FIG. 3 is an enlarged cross section showing support structure of a mirror holder of the aforesaid embodiment.

As shown in FIG. 3, a hole 42A is provided inside the pair of pin 42. A spring 42B is accommodated in the hole 42A and a ball (steel ball) 43C is pressed and biased by the spring 42B against a conic hole 43A formed in the holder 43. Accordingly, the holder 43 is pivotally supported at two points on an axis parallel to the optical axis of the objective 1.

The movement converter 45 includes a rocking shaft 47 projecting from the holder 43 opposite to the reference mirror 13 and having a pointed end with a slant surface 46 abutting to a pointed end of the adjusting knob 44, and a spring 48 as an biasing means for biasing the rocking shaft 47 so that the slanting surface 46 of the rocking shaft 47 constantly abuts to the adjusting knob 44. The spring 48 is guided by the pin 48A projecting from an inner circumference of the mirror-accommodating barrel 31 and a stopper pin 49 for restricting movement range of the rocking shaft 47 projects from the inner circumference of the mirror-accommodating barrel 31 opposite thereto. Incidentally, a spring 50 is inserted between an outer end of the mirror-accommodating barrel 31 and the adjusting knob 44.

In order to adjust the width and the direction of the interference fringes in the above arrangement, after the set-screw 3 is loosened to turn the optical interference unit 11 around the optical axis of the objective 1 to a position easy for the observer to work, the width and the direction of the interference fringes is adjusted.

Figure 4:
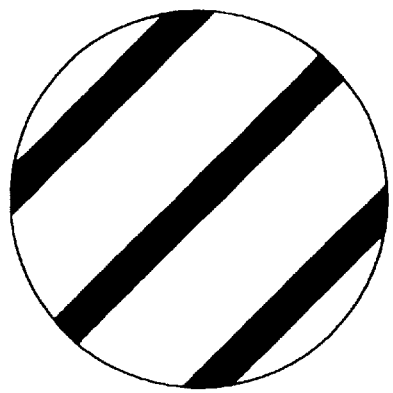
FIG. 4 is an illustration showing shift of interference fringes observed in width adjustment of the interference fringes in the aforesaid embodiment.
Figure 4:
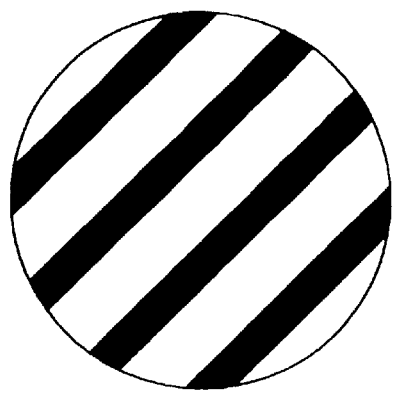

For adjusting width of the interference fringes, the adjusting knob 44 is revolved to move the adjusting knob 44 in an axial direction thereof. Then, the holder 43 having the reference mirror 13 is pivotally moved centering the pin 42 through the movement converter 45, the width of the interference fringes can be adjusted. For example, adjustment from a condition shown in FIG. 4(A) to a condition shown in FIG. 4(B) is possible. At this time, since the position of the light-reflective surface of the reference mirror 13 and the pin 42 come close, the distance from the optical axis of the object lens 1 to the reference mirror 13 can be kept approximately the same.

Figure 5:
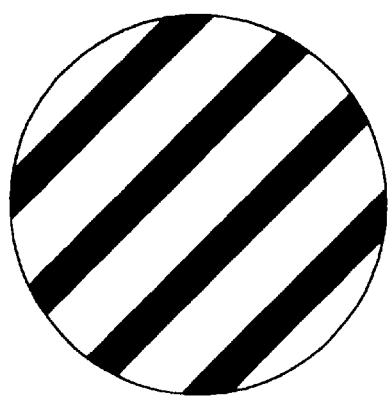
FIG. 5 is an illustration showing shift of interference fringes observed in direction adjustment of the interference fringes in the aforesaid embodiment.
Figure 5:
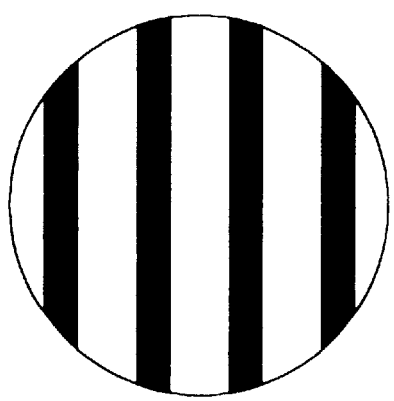
Figure 6:
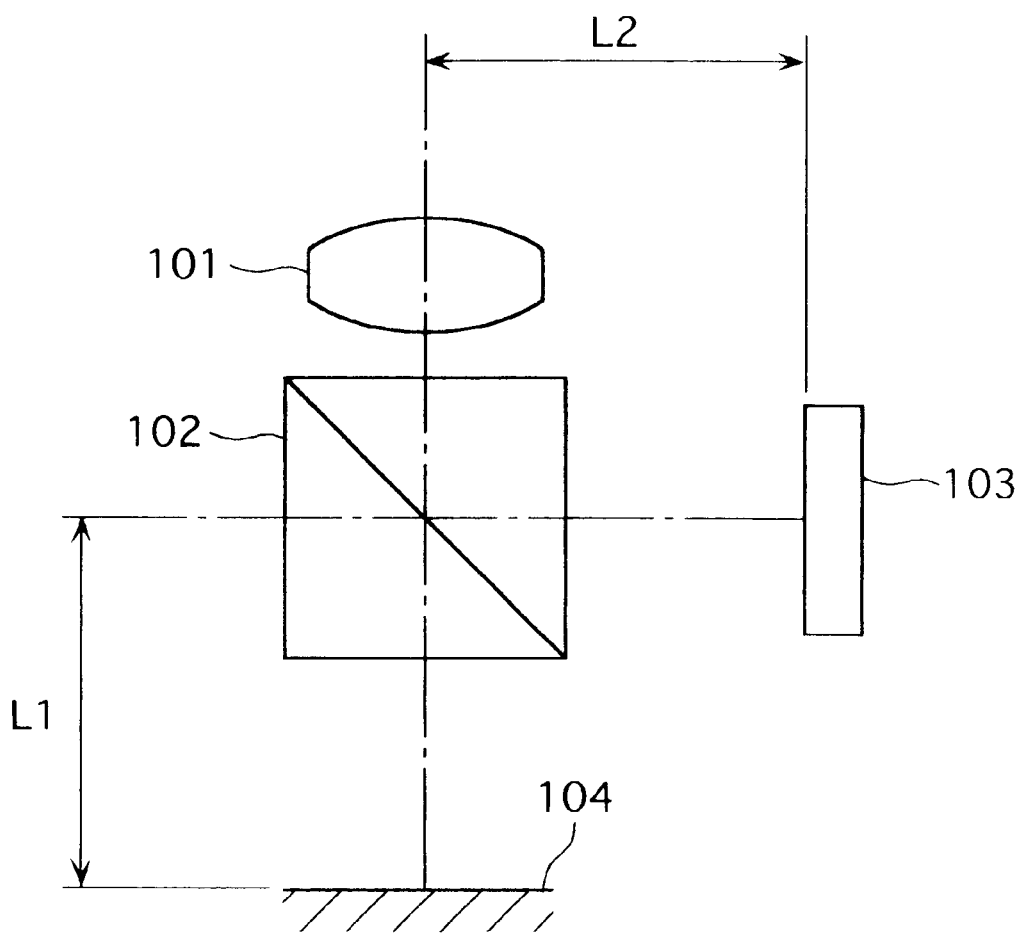
FIG. 6 is an illustration for showing principle of two beam interference objective device.

For adjusting the direction of the interference fringes, the mirror-accommodating barrel 31 is turned relative to the prism-accommodating barrel 21 centering the first light-path of the prism 12. Then, since the reference mirror 13 is turned centering the first light-path, the direction of the interference fringes can be adjusted. For example, adjustment from a condition shown in FIG. 5(A) to a condition shown in FIG. 5(B) is possible.

Incidentally, when the first light-path of the prism 12 is opened by sliding the shutter 22, interference fringes can be observed. On the other hand, when the other divided optical path is shut, general bright-field can be observed.

According to the present embodiment, following effects can be obtained.

First, since the adjusting knob 44 is turned to adjust the width of the interference fringes and, thereafter, the direction of the interference fringes can be adjusted by revolving the mirror-accommodating barrel 31 while keeping the width of the interference fringes, the width and the direction of the interference fringes can be adjusted by a single-hand operation. Further, in switching the adjustment, since the adjusting knob 44 and the mirror-accommodating barrel 31 are closely and coaxially provided, easy and rapid switch by single-hand operation is possible, thereby improving operability and working efficiency.

Further, for adjusting width of the interference fringes, since the reference mirror 13 is pivotally moved centering the pair of pin 42 parallel to the optical axis of the objective 1 while keeping approximately the same distance from the optical axis of the objective 1 to the reference mirror 13, the width of the interference fringes can be adjusted while fixing zero-order band of the interference fringes at a center of field.

Since the reference mirror 13 is revolved centering the first divided optical path when the direction of the interference fringes is adjusted, the direction of the interference fringes can be adjusted while keeping the width of the interference fringes established by the width adjustment.

Since the tilting device 14 includes the prism-accommodating barrel 21 provided with the prism 12 thereinside, the mirror-accommodating barrel 31 connected to the prism-accommodating barrel 21 and having the reference mirror 13 thereinside, the width adjuster 41 for pivotally moving the reference mirror 13 centering the axis parallel to the optical axis of the objective 1, and the direction adjuster 51 for turning the mirror-accommodating barrel 31 centering the first light-path, the two beam interference objective device can be constructed only by connecting the prism accommodating barrel 21 of the tilting device 14 to the ordinary objective 1.

Since the optical interference unit 11 is rotatable around the optical axis of the objective 1, the manipulative position of the width adjuster 41 and the direction adjuster 51 can be rotated centering the optical axis of the objective 1, so that the manipulative position can be shifted to a position easy for the observer to manipulate.

Further, since the shutter 22 for opening and closing the first divided optical path of the prism 12 is provided, both of the interference fringes and the bright-field can be measured by the single objective 1 by opening and closing the divided optical path by the shutter 22.

Incidentally, though the position of the pin 42 for supporting the holder 43 having the reference mirror 13 is arranged close to the light-reflective surface of the reference mirror 13 in the above-described embodiment, the position of the pin 42 is preferably located closer to the light-reflective surface of the reference mirror 13, preferably at the same position.

Further, though the prism 12 is used as the optical path dividing member in the above-described embodiment, other optical element may be used as long as the light can be divided to the reference mirror 13 and the sample 4 and the reflected light therefrom can be superposed.

What is claimed is:

1. A two-beam interference objective device used to analyze a sample, comprising:

an objective lens;

an optical path dividing member provided between the objective lens and a sample to divide a light beam into first and second light beams transitting a first light path and a second light path respectively;

a reference mirror provided in the first light path; and a tilting device for tilting the reference mirror to adjust width and direction of interference fringes generated by the first light beam reflected by the reference mirror and the second light beam reflected by the sample disposed in the second light path, the tilting device comprising:

a width adjuster for pivotally moving the reference mirror around an axis parallel to an optical axis of the objective lens while keeping an approximately constant distance from the optical axis of the objective lens to the reference mirror; and a direction adjuster for turning the reference mirror around the first light path, the width adjuster and the direction adjuster each being manipulatable without altering a setting set by the other.

2. The two-beam interference objective device according to claim 1, wherein the tilting device includes a first accommodating barrel connected to the objective lens and having the optical path dividing member thereinside, a second accommodating barrel connected to the first accommodating barrel and having the reference mirror thereinside, the width adjuster for pivotally moving the reference mirror around the axis parallel to the optical axis of the objective lens while keeping the approximately constant distance from the optical axis of the objective lens to the reference mirror and the direction adjuster for turning the second accommodating barrel around the axis of the first light path.

3. The two-beam interference objective device according to claim 2, the width adjuster further comprising a holder pivotally supported in the second accommodating barrel around the axis parallel to the optical axis of the objective lens and having the reference mirror, an adjusting knob screwed to the second accommodating barrel along the first light path, and a movement converter for converting an axial movement of the adjusting knob to a pivotal movement of the holder.

4. The two-beam interference objective device according to claim 2, wherein the first accommodating barrel is rotatable around the optical axis of the objective lens.

5. The two-beam interference objective device according to claim 1, wherein a shutter for opening and closing the first light path is provided between the optical path dividing member and the reference mirror.

6. A two-beam interference objective device used to analyze a sample, comprising:

an objective lens, an optical path dividing member provided between the objective lens and sample to divide a light beam into first and second light beams transitting a first light path and a second light path, respectively;

a reference mirror provided in the first light path; and tilting means for tilting the reference mirror to adjust width and direction of interference fringes generated by the first light beam reflected by the reference mirror and the second light beam reflected by the sample disposed in the second light path, the tilting means comprising:

width adjusting means for pivotally moving the reference mirror around an axis parallel to an optical axis of the objective lens while keeping an approximately constant distance from the optical axis of the objective lens to the reference mirror; and direction adjusting means for turning the reference mirror around the first light path.

7. The two-beam interference objective device according to claim 6, wherein the tilting means includes a first accommodating barrel connected to the objective lens and having the optical path dividing member thereinside, a second accommodating barrel connected to the first accommodating barrel and having the reference mirror thereinside, the width adjusting means for pivotally moving the reference mirror around the axis parallel to the optical axis of the objective lens while keeping the approximately constant distance from the optical axis of the objective lens to the reference mirror and the direction adjusting means for turning the second accommodating barrel around the axis of the first light path.

8. The two-beam interference objective device according to claim 7, the width adjusting means further comprising a holder pivotally supported in the second accommodating barrel around the axis parallel to the optical axis of the objective lens and having the reference mirror, an adjusting knob screwed to the second accommodating barrel along the first light path, and a movement converter for converting an axial movement of the adjusting knob to a pivotal movement of the holder.

9. The two-beam interference objective device according to claim 7, wherein the first accommodating barrel is rotatable around the optical axis of the objective lens.

10. The two-beam interference objective device according to claim 6, wherein a shutter for opening and closing the first light path is provided between the optical path dividing member and the reference mirror.

\* \* \* \* \*